United States Patent [19]

Uedaira et al.

[11] Patent Number: 4,810,484

[45] Date of Patent: Mar. 7, 1989

[54] METHOD FOR MANUFACTURING FINE LEAD TITANATE POWDERS

[75] Inventors: Satoru Uedaira; Masayuki Suzuki; Hiroshi Yamanoi; Hidemasa Tamura, all of Kanagawa, Japan

[73] Assignee: Sony Corporation, Tokyo, Japan

[21] Appl. No.: 63,776

[22] Filed: Jun. 24, 1987

Related U.S. Application Data

[63] Continuation of Ser. No. 812,466, Dec. 23, 1985, abandoned.

[30] Foreign Application Priority Data

Dec. 28, 1984 [JP] Japan ............... 59-275618

[51] Int. Cl.$^4$ .................. C01G 23/00; C01G 21/00
[52] U.S. Cl. ....................... 423/598; 423/619
[58] Field of Search ................ 423/598, 619

[56] References Cited

U.S. PATENT DOCUMENTS

| | | | |
|---|---|---|---|
| 3,361,519 | 1/1968 | Aykan | 423/598 |
| 4,061,583 | 12/1977 | Murata et al. | 423/598 |
| 4,282,200 | 8/1981 | Nishikawa et al. | 423/598 |

FOREIGN PATENT DOCUMENTS

| | | | |
|---|---|---|---|
| 104002 | 3/1984 | European Pat. Off. | 423/598 |
| 6104715 | 8/1981 | Japan | 423/598 |
| 6100138 | 8/1981 | Japan | 423/598 |
| 6149710 | 11/1981 | Japan | 423/598 |
| 60-86024 | 5/1985 | Japan | 423/598 |

*Primary Examiner*—Robert L. Stoll

[57] ABSTRACT

A method for manufacturing fine powders of lead titanate which includes the steps of reacting a water-soluble titanium compound or the hydrolysis product of a titanium compound with a lead compound in an aqueous alkaline solution having a pH value not less than 11.2, at a temperature not less than 100° C. to obtain a precipitate of lead titanate fine powder, and then recovering the lead titanate fine powder from the remaining solution.

By adjusting the pH and the synthesis temperature at proper values, it is possible to synthesize different forms of lead titanate, including a perovskite structure, a pyrochlore structure, or acicular (needle-like) crystals with a novel crystal phase.

The acicular fine lead titanate crystals have an X-ray diffraction peak at $2\theta = 30.71°$ using a copper target.

4 Claims, 10 Drawing Sheets

METHOD FOR MANUFACTURING FINE LEAD TITANATE POWDERS

This is a continuation of Ser. No. 812,466 filed 12/23/85, now abandoned.

BACKGROUND OF THE INVENTION

Field of the Invention

This invention is in the field of manufacturing fine lead titanate crystals by a chemical precipitation process, the crystals being useful as ferroelectric, piezoelectric or pyroelectric materials.

Description of the Prior Art

In the field of dielectric porcelain, new methods for the synthesis of fine dielectric oxide particles used as starting materials are being devised to meet the demand for small size electronic parts or other uses.

For example, in a multi-layer ceramic capacitor, it is necessary to reduce the thickness of the ceramic layer in order to increase the capacity while reducing the size and weight of the capacitor. It is accordingly necessary to comminute the starting dielectric oxides. From the standpoint of pressure resistance of the capacitors, extraordinary grain growth or non-uniform particle sizes at the sintering stage is to be avoided. Therefore, it is necessary to provide methods which are adapted for the synthesis of uniform sized particles.

In piezoelectric actuators, bimorph or pyroelectric LR sensors making use of piezoelectric or pyroelectric materials, there is an increasing demand for a uniform grain size. Above all, oriented ceramics would be preferred from the standpoint of manufacturing costs to oriented thin films obtained by high frequency sputtering, especially when the ceramics are to be used as sensor materials.

One of the most commonly used starting materials for dielectric oxides is lead titanate because of its numerous superior quality. Lead titanate, $PbTiO_3$, is usually prepared by mixing lead oxide, PbO, with titanium oxide, $TiO_2$, crushing the mixture in a ball mill, calcining the resulting product at 800° to 1000° C., again crushing to a uniform particle size, and sintering the resulting product.

In the preparation of fine powders of lead titanate in this manner, evaporation of PbO presents problems. With higher calcination temperatures, PbO evaporation is increased exponentially, thus changing the composition of the resulting fine lead titanate particles. In order to prevent this, some technique must be used during heat treatment, such as calcining the product in a PbO atmosphere. Although a lower calcination temperature may be used during sintering to reduce PbO evaporation, there may remain a considerable amount of the unreacted PbO at the time of terminating the sintering. Since the unreacted PbO is likely to be evaporated at the sintering stage, it becomes necessary to control the atmosphere. With fine lead titanate powders obtained by solid phase reaction relying upon heat treatment, A-site defects in the perovskite structure may be caused, resulting in less than stoichiometric amounts being present. Such non-stoichiometricity is very likely to affect piezoelectric or pyroelectric properties. Even in the event that high stoichiometricity is achieved by the high temperature heat treatment, the sintering may be affected by the above described process of preparing the starting materials. This is because the lead titanate exhibits the most pronounced crystal anisotropy among a variety of crystals having the perovskite structure, that is, that it shows an acute tetragonal strain with the result that it has a markedly different heat expansion coefficient in a given direction and hence is likely to crack during the lowering of the temperature. Various additives designed to improve the calcination properties may present problems in the piezoelectric properties. Lead titanate is effectively employed by making the best of its properties such that the electromechanical coupling factor of the longitudinal wave is larger than that of the transverse wave. There is, however, a risk that the addition of the impurities of the additive may lower the desired properties of the material. For this reason, lead titanate obtained by the solid phase reaction method is usually not used in its pure form but only for either its piezoelectric properties or calcination properties, which are contradictory to each other.

For a practical use of transparent ceramic starting materials, attempts have been made to improve the non-uniformity of the particle size, reduction in activity, and the manner of mixture of the impurities in order to obtain a uniform particle size.

For example, there is described in Japanese Patent Application No. 2080/1976 a wet synthesis method according to which the A-ion and B-ion salts of the perovskite structure $ABO_3$ to be syntheiszed are reacted under boiling conditions in an aqueous alkaline solution. However, in this case, it is necessary that the ratio of A-ion to B-ion be equal to or greater than 1.8. In additiona, fluctuations may be caused because the synthetic ion concentration is not equal to unity. In addition, the post-synthesis product is amorphous and in the form of hydrates. Consequently, heat treatment at 300° to 400° C. is required to obtain crystalline particles, while excess $PbCl_2$ which is an impurity at the time of synthesis must be removed by decantation, but this impurity is difficult to remove completely.

With the known oxalate method, it is difficult to obtain a product of uniform quality because of the different pH areas of precipitation or the different solubilities of the oxalates depending on the kinds of metal ions. The use of organic compounds such as oxalates presents problems in manufacturing costs and productivity.

In another known method, the oxalic acid ethanol method, while a certain improvement is achieved as to uniformity of the composition, there are problems concerned with manufacturing costs and productivity which are yet to be solved.

There is also known what is termed the metal alcoxide method according to which organometal compounds having the general formula M(OR)n are prepared and a composite alcoxide represented by the general formula $M_I M_{II}(OR)m$ is prepared and hydrolyzed. The known method also presents problems in manufacturing costs and productivity. The resulting precipitates, while being pure, are amorphous and need to be heat-treated at about 400° C.

To summarize, it is difficult in any of the known methods to synthesize crystalline fine particles or powders of lead titanate from the liquid phase without resorting to heat treatment, or to yield fine crystals of lead titanate with high purity and uniformity. It is completely impossible to control the shape of the fine lead titanate particles dependent upon the intended usage.

SUMMARY OF THE INVENTION

The present invention provides fine crystals of lead titanate of uniform and nearly stoichiometric composition, as well as a method of making the same.

The present invention further provides a fine lead titanate acicular crystal having a novel structure.

One of the features of the present invention is making possible the obtaining of fine lead titanate crystals directly from a solution reaction.

In summary, the present invention provides a method for manufacturing lead titanate fine powders comprising the steps of reacting a water-soluble titanium compound or a hydrolysis product of a titanium compound with a lead compound in a liquid aqueous alkaline solution having a pH value not less than 11.2 and at a temperature not less than 100° C. to obtain precipitates of fine powders of lead titanate. Depending upon the reaction conditions used, several different forms of lead titanate powders can be produced.

The present invention also resides in providing an acicular tetragonal lead titanate composed of fine crystals having an X-ray diffraction peak at $2\theta = 30.71°$ using a copper target.

BRIEF DESCRIPTION OF THE DRAWINGS

A further description of the present invention will be made in conjunction with the attached sheets of drawings in which.

DESCRIPTION OF THE PREFERRED EMBODIMENTS

As a result of our research, we have provided a method of wet preparation of fine lead titanate particles with high and uniform quality, free from lattice strain and without resorting to heat treatment. We have determined that by adjusting the pH and the synthesis temperature at proper values, it is possible to synthesize fine lead titanate crystals of the perovskite type, the pyrochlore type, or acicular fine lead titanate crystals with a novel crystal phase.

In accordance with the prssent invention, fine lead titanate powders are obtained by reacting soluble titanium compounds or hydrolysis products thereof with lead compounds at temperatures in excess of 100° C. in an aqueous solution having a pH higher than 11.2.

The perovskite fine structure crystals of lead titanate are obtained at temperatures higher than 175° C., with a temperature of the reaction solution equal to about 12.7. Pyrochlore structure fine crystals of lead titanate are obtained at temperatures of 100 to 190° C., at a pH higher than 12.1.

The acicular (needle-like) fine crystals of lead titanate are obtained by the reaction at a pH in the range from 11.2 to 13.0 and a temperature higher than 145° C.

The acicular fine crystals of lead titanate are tetragonal crystals, having an eminent diffraction peak upon X-ray diffraction with a Cu target equal to $2\theta = 30.71°$ where $\theta$ is the diffraction angle. This material is highly promising is a dielectric porcelain material for use with compound materials.

The fine acicular lead titanate particles having a novel crystal phase and the pyrochlore structure crystals can be converted into the perovskite structure by heat treatment at more than 520° C., and preferably more than 650° C., while their respective shapes are maintained.

Figure 1:
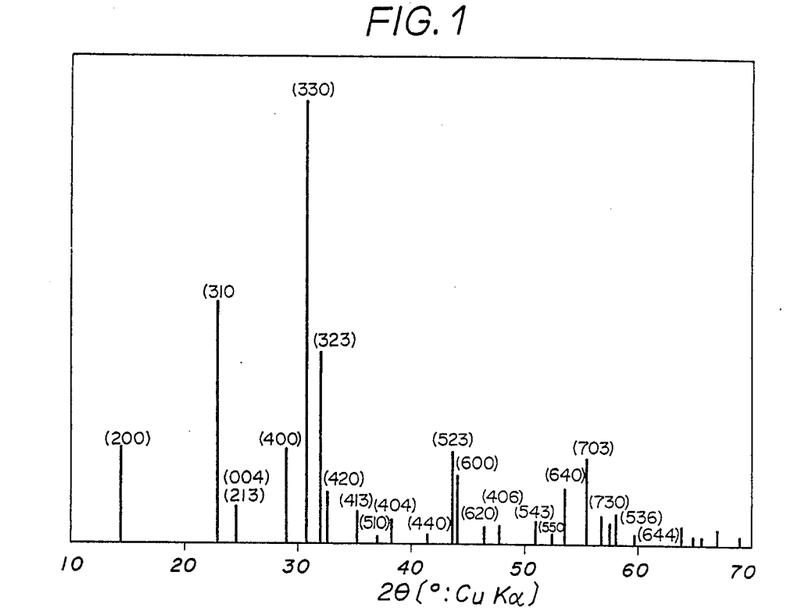
FIG. 1 illustrates the X-ray diffraction spectrum of the fine lead titanate crystals according to the present invention.

FIG. 1 shows an X-ray diffraction spectrum of fine lead titanate crystals according to the present invention. It will be noted that the fine crystals shown in FIG. 1 were synthesized under reaction conditions including a pH of 12.0, a reaction temperature of 182° C., and a reaction time of one hour, using a method which will be later described. The X-ray diffraction was measured by using a Cu target and an Ni filter.

It will be seen from FIG. 1 that the fine lead titanate crystals exhibit a diffraction pattern which is different not only from the pattern of the perovskite phase lead titanate crystals but from the pyrochlore phase crystals. The present inventors also found the values of the diffractive crystal plane distance and the mirror index by calculation from the values of the diffraction angles $\theta$ of the respective X-ray diffraction peaks of the diffraction patterns. The results are shown in the Table below.

TABLE

| $2\theta$ | (h k l) | crystal plane interval d |
| --- | --- | --- |
| 14.33 | 200 | 6.18069 |

TABLE-continued

| 2θ | (h k l) | crystal plane interval d |
|---|---|---|
| 22.76 | 310 | 3.90695 |
| 24.46 | (004) (213) | 3.63913 |
| 28.91 | 400 | 3.08830 |
| 30.71 | 330 | 2.91127 |
| 32.00 | 323 | 2.79679 |
| 32.40 | 420 | 2.76317 |
| 35.20 | 413 | 2.54953 |
| 37.08 | 510 | 2.42447 |
| 38.20 | 404 | 2.35592 |
| 41.31 | 440 | 2.18546 |
| 42.69 | 530 | 2.11796 |
| 43.65 | 523 | 2.07358 |
| 43.95 | 600 | 2.06012 |
| 46.48 | 620 | 1.95371 |
| 47.75 | 406 | 1.90467 |
| 50.15 | (008) (426) | 1.81900 |
| 50.93 | 543 | 1.79296 |
| 52.36 | 550 | 1.74731 |
| 53.17 | 624 | 1.72259 |
| 53.47 | 640 | 1.71363 |
| 55.40 | 703 | 1.65841 |
| 56.73 | 730 | 1.62265 |
| 57.53 | 723 | 1.60198 |
| 57.81 | 536 | 1.59488 |
| 59.62 | 644 | 1.55072 |

In this manner, the fine lead titanate crystals of the present invention exhibit acute X-ray diffraction peaks at $2\theta=22.76°$, $2\theta=28.91°$, $2\theta=30.71°$, $2\theta=32.00°$, $2\theta=43.65°$, and $2\theta=55.40°$, wherein $\theta$ designates the diffraction angle. It has also been found that these fine line lead titanate crystals are tetragonal crystals with the dimensions $a_o=12.34$ Å and $c_o=14.5$ Å.

The Pb/Ti molar ratio at the time of synthesis amounts to about 1.01 indicating extremely high stoichiometricity.

The method for the preparation of fine lead titanate needle crystals having the above-described crystal phase, hereafter referred to as as the PX phase, is explained as follows.

In preparing the fine lead titanate crystals, soluble titanium compounds such as titanium tetrachloride, or hydrolysis products thereof are mixed with water-soluble lead salts or hydrolysis products thereof. The resulting mixture is reacted in an aqueous alkaline solution at an elevated temperature in excess of 100° C., the resulting precipitates are washed in cold or warm water for complete removal of monovalent ions such as alkaline positive ions including potassium or sodium ions, or negative ions such as chloride ions. The resulting product is then filtered and dried.

Figure 2:
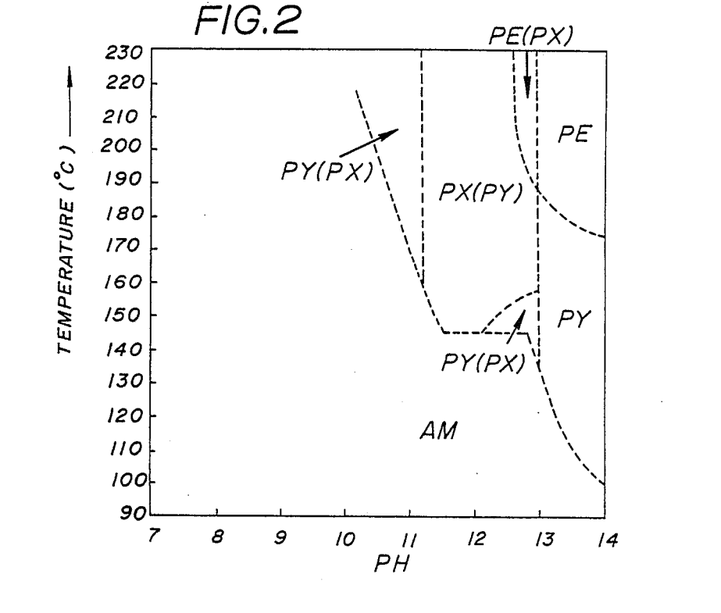
FIG. 2 is a phase diagram of the pH-temperature relationship in the wet synthesis.

During the reaction, the pH values and the reaction temperatures are critical because the aforementioned PX phase, perovskite phase (hereinafter referred to as the PE phase) or the perochlore phase (hereinafter referred to as the PY phase) are produced selectively as a function of the pH values and/or the reaction temperatures. The present inventors conducted a series of tests in an attempt to prepare a phase diagram of the fine lead titanate crystals for various pH values and reaction temperatures. The results are shown in FIG. 2. From this Figure it will be seen that the PY phase is stable from the low alkalinity, high temperature range to the high alkalinity, low temperature range. The PE phase is stable only in the high alkalinity, high temperature range, while the PX phase is produced only within a specified range. In FIG. 2, the phases indicated in brackets are by-products produced only in negligible amounts. The legend AM denotes lead titanate in the amorphous state.

For preparing fine lead titanate crystals of the PX phase, a pH value in the range of 11.2 to 13.0 and reaction temperatures not lower than 145° C. are required. A pH value in the range from 11.5 to 12.5 and a reaction temperature not lower than 180° C. are preferred. By observing these reaction conditions, the PX phase is produced almost exclusively as a unitary phase. A reaction time less than one hour is usually sufficient.

With a pH value higher than 12.7 and preferably higher than 13.1, and with a reaction temperature not lower than 175° C. and preferably not lower than 190° C., fine lead titanate crystals of the PE phase are selectively produced. A reaction time of less than one hour also suffices. Fine lead titanate crystals of the PE phase obtained in this manner are crystalline precipitates substantially free from moisture and are fine cube-like crystals having a highly uniform particle size of 6 to 8 microns. The crystal planes of the cube are (100) or a plane, and (001) or c plane. Sheets of high orientation can be obtained by casting the crystals with a suitable resin mixture. An a plane disk can be prepared by pressing a molding so that the material is promising as a starting powder material suitable for high orientation calcination. The resulting fine lead titanate crystals of the PE phase can be controlled in particle size by changing the agitation speed or shifting the pH value only slightly during the reaction, to produce materials which are extremely high in stoichiometricity. When subjected to heat treatment, the PE phase is increasingly free from crystal lattice strain with increases in temperature. Also, it is extremely low in the lattice strain in the C-axis so that it has promising piezoelectric and pyroelectric properties.

By adjusting the pH value so as to be not less than 12.1 and preferably not less than 13.0, with reaction temperatures in the range of 100° to 190° C., preferably in the range from 110° to 175° C., the PY phase is selectively produced. The reaction time of less than one hour is sufficient, however, with longer reaction times, there is a better crystallinity of the resulting PY phase. PY phase fine lead titanate crystals are extremely high in stoichiometricity. In addition, the crystal size is less than 0.2 micron wich is less than that obtained with the conventional solid-phase reaction process by one order of magnitude so that these crystals are highly useful as capacitor materials or additives or as starting materials for high density calcined products.

In other areas, amorphous lead titanate with a Pb/Ti ratio about equal to unity may be produced. In this case, the hydrothermal reaction is preferably carried out with a pH value higher than 7. When the amorphous lead titanate only is desired, the pH value should not be higher than 10, while the reaction temperature should be higher than 110° C. and preferably higher than 150° C. The amorphous lead titanate is converted into the PE phase by heat treatment at a temperature higher than 700° C. When the amorphous lead titanate synthesized at a pH lower than 7 is heat-treated at 830° C., compound $PbTi_3O_7$ is mainly produced. When the pH is equal to 4, the product is predominantly $PbTi_3O_7$. With a rise in pH value, $PbTiO_3$ becomes gradually mixed with $PbTi_3O_7$. It therefore follows that the amorphous lead titanate when used as an additive preferably has a pH value not lower than 7.

When the aforementioned phases are obtained as mixed phases, for example when the PY and PX phases are both obtained, the latter can be subjected to ultrasonic washing for separating the mixture into the PY phase which is a supernatant and the PY phase which is an initial precipitate.

For obtaining Ti compounds or their hydrolysis products used as starting materials for the synthesis of the improved lead titanate crystals, salts such as $TiCl_4$ or $Ti(SO_4)_2$ can be dissolved in water or aqueous solutions thereof can be hydrolyzed with aqueous alkaline solutions such as KOH, NaOH, $NH_4OH$ or LiOH. It will be noted that when $Ti(SO_4)_2$ is used, it may be hydrolyzed with the aforementioned alkaline solution to produce titanium oxide hydrates ($TiO_2 \cdot nH_2O$) from which sulfate ion may be removed by repeated decantation and/or filtration.

As lead compounds, lead acetate $Pb(CH_3COO)_2 \cdot COOO)_2 \cdot 3H_2O$, lead nitrate $Pb(NO_3)_2$ or lead chloride $PbCl_2$, may be used. In the case of lead chloride, it is preferable that this material be previously treated with alkaline hot water.

Although the molar ratio of the starting materials is not critical, it will usually be set as 1:1. Excess lead can be washed off easily, but excess titanium has to be removed by a separate process.

The apparatus for reactions at higher temperatures than 100° C. can be an autoclave, the reaction vessel which is preferably formed of a material capable of withstanding high temperatures and high alkalinity such as polytetrafluoroethylene (Teflon).

To summarize, in the wet synthesis of fine lead titanate crystals, three different kinds of fine lead titanate crystals consisting of perovskite or PE phase, pyrochlore or PY phase, and the new crystal phase, the PX phase, can be synthesized by appropriate selection of the pH value and the synthesis temperature. Above all, the fine lead titanate crystals of the new crystal phase or PX phase can be selectively synthesized by setting the pH value to the range of 11.2 to 13.0, and a temperature not lower than 145° C. These PX phase fine crystals are acicular crystals with a length to diameter ratio more than several multiples of ten, for example, on the order of 100. Therefore, these crystals can probably be used as composite materials with good results.

A description with reference to several specific examples is given below. It should be noted that the scope of the present invention is by no means limited to these examples.

EXAMPLE 1

Ice water was poured into a beaker, and a titanium tetrachloride solution was added dropwise, with a small amount each time. Although turbid at the outset, the solution, after stirring for several hours, turned into a wholly transparent aqueous solution of titanium tetrachloride which was transferred to a measuring flask so as to be used as a standard solution. A 10 ml fraction was taken of the standard solution and hydrolyzed with an excess amount of aqueous ammonia. After the $TiO_2 \cdot nH_2O$ was filtered off, the fraction was heat-treated at 1000° C. and the concentration was determined by the gravimetric method. The measured value of titanium tetrachloride was 0.9681 mol/liter.

22.32 g of lead acetate $Pb(CH_3COO)_2 \cdot 3H_2O$ were accurately weighed out and dissolved in 100 ml of water. To this lead acetate solution was added 60.7 ml of the titanium tetrachloride standard solution so that the Pb/Ti ratio was equal to 1.000. A white preciptate of $PbCl_2$ evolved at this time but was not hindersome to the subsequent reaction process.

A previously prepared KOH solution was added to the reaction product for adjusting its pH value to 12.0. The total amount of solution was adjusted to 400 ml.

The solution was divided into four equal parts of 100 ml. These samples were transferred to Teflon autoclave vessels where the reaction was carried out at temperatures which ranged from 150 to 220° C. by using an electric oven and with a reaction time interval of one hour. The resulting precipitates were washed thoroughly with warm water for the removal of impurities, and decantation was repeatedly carried out until the pH value was nearly equal to 7. The resulting product was filtered and dried overnight to produce fine lead titanate crystals.

Figure 3:
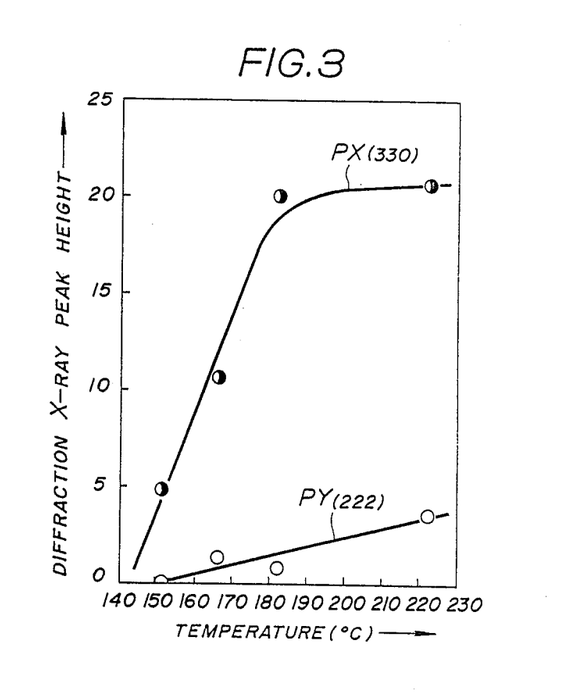
FIG. 3 is a diagram showing the temperature dependency of the PX and PY phases for a pH equal to 12.0.

The resulting crystals were analyzed with X-ray diffraction using a Cu target and Ni filter for investigating the ratio of crystal phases present. The results are shown in FIG. 3. The respective yields of the PY and PX phase crystals are indicated in terms of the (222) and (330) diffraction X-ray peak height.

From this Figure it will be seen that with a reaction temperature less than 140° C., the product is mainly amorphous and with an increase in the reaction temperature, the amount of the PX phase is increased gradually, while the PY phase is also increased although only slightly.

Figure 4:
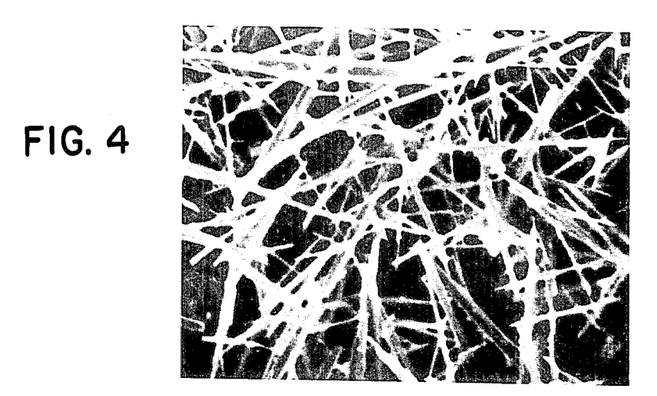
FIG. 4 is an SEM photograph showing the fine lead titanate crystals of the PX phase obtained at a pH of 12.0, a reaction temperature of 182° C., and a reaction time of one hour.

FIG. 4 is a photo taken with a scanning electron microscope (SEM) of the PX phase fine lead titanate crystals obtained with a pH of 12.0, a reaction temperature of 182° C., and a reaction time of one hour. It will be seen from this Figure that the resulting PX phase fine lead titanate crystals are needle-like particles of 0.1 to 0.2 microns in diameter, and more than 10 microns in length.

Upon analysis of the composition of the PX phase, it was found that the Pb/Ti ratio was equal to about $1.009 \pm 0.005$.

Figure 5:
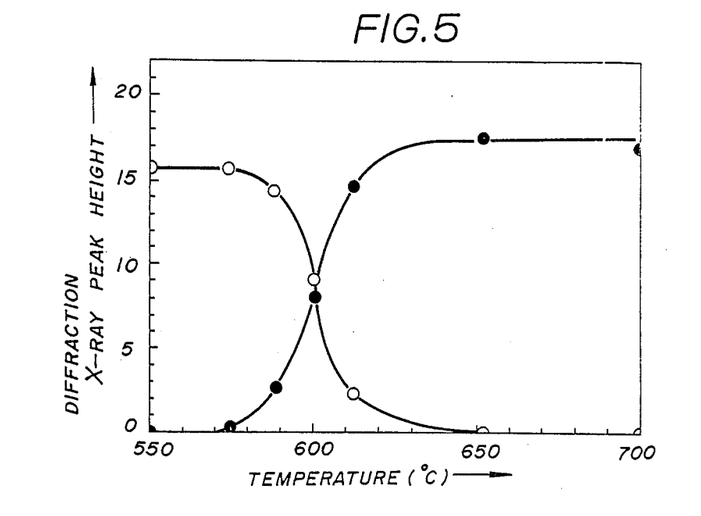
FIG. 5 is a diagram showing the phase transition from the PX phase to the PE phases.

Upon analysis of the phase transition of the resulting PX phase by heat treatment, it was found, as shown in FIG. 5, phase transition into the PE phase started at or near 570° C. and was completed at higher than 650° C. The PX to PE ratio was determined from the diffraction X-ray peak height of the PX phase (330) and that of the PE phase (110).

It should be noted that the heat treatment temperature for the PX phase is greater than 520° C. and is preferably higher than 550° C., provided that the retention time at the predetermined heat treatment temperature is 10 hours or longer. In the absence of the retention time at the ultimate temperature, phase transition to the PE phase commences with a heat treatment temperature higher than 580° C. When completely using the ferroelectric PE phase, it is preferred to effect the heat treatment at higher than 650° C. When higher activity is desired, a lower heat treating temperature range such as 580° C. to 620° C. is to be preferred.

In any case, the heat treatment temperature above 900° C. tends to mar the needle shape, with the particle configuration approaching that of a spherical configuration. Consequently, if the needle configuration is to be retained, the heat treatment temperature should be lower than 900° C.

EXAMPLE 2

The standard titanium tetrachloride solution having a concentration equal to 0.9681 mol/liter was prepared in the same manner as in Example 1.

19.49 g of lead nitrate $Pb(NO_3)_2 \cdot 3H_2O$ was accurately weighed out and dissolved in 100 ml of water. To the resulting mixture was added 60.79 ml of the standard titanium tetrachloride solution so that the Pb/Ti ratio would be equal to 1.000. The total volume of the solution was adjusted to 400 ml with a KOH aqueous solution, so that the lead acetate solution had a pH value of 12.9.

The lead acetate solution was divided into five equal portions of 80 ml each. These fractions were reacted with the aid of the autoclave at reaction temperatures ranging from 130° to 230° C. to give fine lead titanate crystals.

Figure 6:
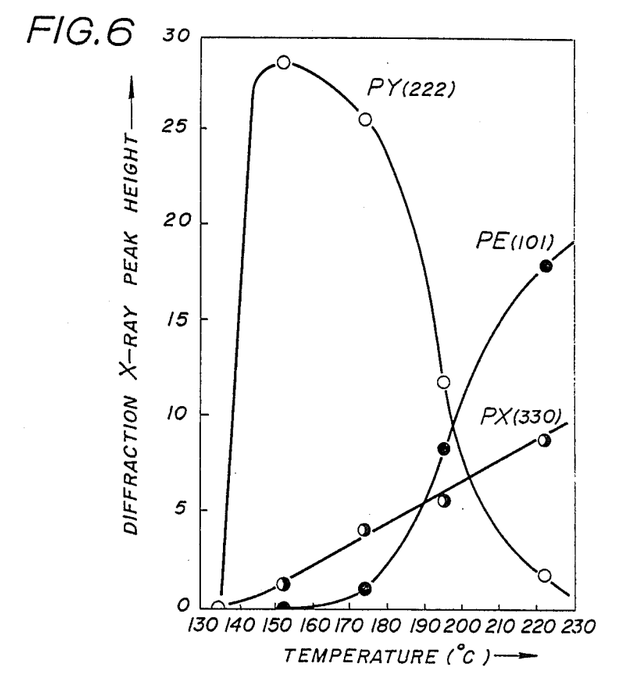
FIG. 6 is a diagram showing the temperature dependency of the PE, PY and PX phases at a pH equal to 12.9.

These crystals were subjected to an X-ray diffraction with the use of the Cu target and the Ni filter for analysis of the crystal phases present. The results are shown in FIG. 6. The yields of the PE, PY and PX phases are indicated in terms of the (101), (222), and (333) diffraction X-ray peak heights, respectively.

It will be seen from FIG. 6 that the product is amorphous for a reaction temperature below 130° C., the PY phase precipitation is abruptly started with rise in the reaction temperature to more than 140° C., the PX phase precipitation is gradually started with a further rise in temperature, and that the PE phase precipitation is abruptly started at the boundary temperature of 195° C.

EXAMPLE 3

The standard titanium tetrachloride solution with a concentration equal to 1.010 mol/liter was prepared in the same manner as in Example 1.

22.32 g of lead acetate was accurately weighed out and dissolved in 100 ml of water. To the resulting mixture was added 58.26 ml of the standard titanium tetrachloride solution so that the Pb/Ti ratio would be equal to 1.000. The total volume of the solution was adjusted to 400 ml with the KOH aqueous solution, so that the lead acetate solution was adjusted to a pH value equal to 14.0.

The lead acetate solution was divided into four equal parts of 100 ml each. These fractions were reacted by means of the autoclave at reaction temperatures of 100° to 230° C. to produce fine lead titanate crystals.

Figure 7:
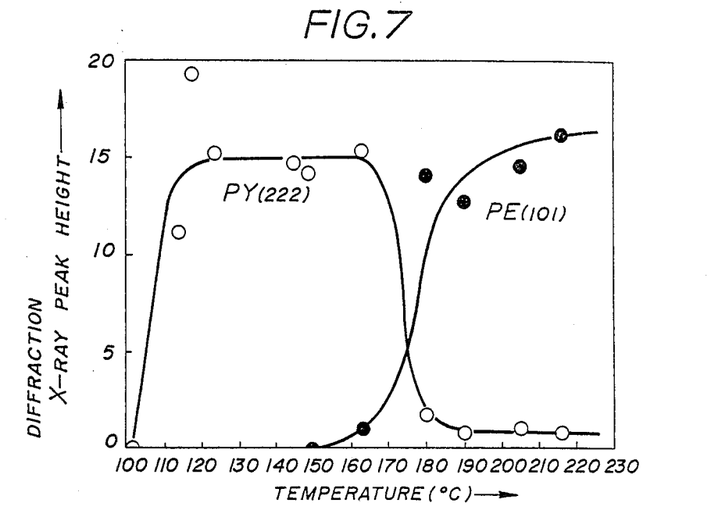
FIG. 7 is a chart showing the temperature dependency of the PE and PY phases for a pH equal to 14.0.

These crystals were subjected to an X-ray diffraction with the use of the Cu target and the Ni filter for analysis of the crystal phases present. The results are shown in FIG. 7. The yields of the PE and PY phases are indicated in terms of the (101) and (222) diffraction X-ray peak height, respectively.

It will be seen from FIG. 7 that the product phase is abruptly changed from the PY to the PE phase at the boundary temperature of 175° C.

Figure 8:
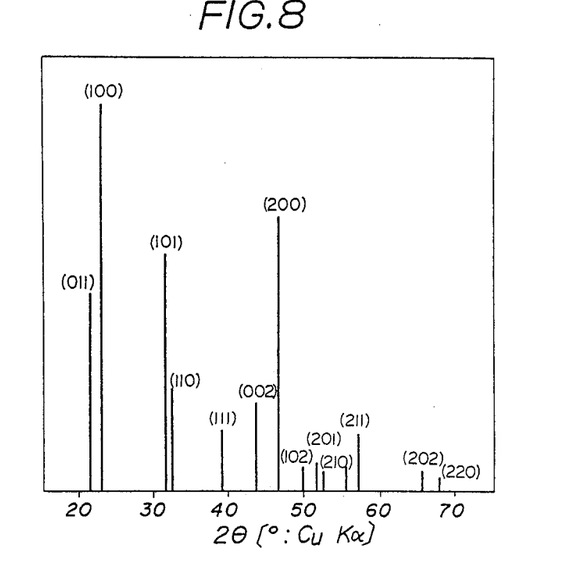
FIG. 8 is a diagram showing the X-ray diffraction spectrum of the resulting PE phase fine crystals of lead titanate.
Figure 9:
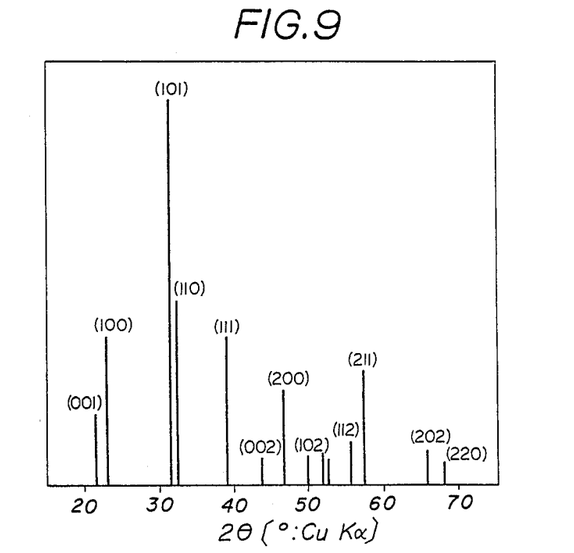
FIG. 9 shows the X-ray diffraction spectrum of the perovskite structure fine crystals of lead titanate obtained by the conventional solid phase reaction method.

The fine lead titanate crystals obtained at a reaction temperature higher than 200° C. are exclusively of the PE phase with its X-ray diffraction spectrum, measured with the Cu target and the Ni filter, being shown in FIG. 8. The phase was identified to be a unitary perovskite phase because of the peak position coincidence thereof with the ASTM card values. Upon calculation of the crystal lattice constant of the lead titanate crystals of the PE phase by the Nelson-Riley's extrapolation function, the crystals are found to be tetragonal crystals with a=3.901 Å and c=4.150 Å. However, the specific intensity of the respective diffraction X-ray peaks of the PE phase were noticeably different from the ASTM card values and that the (100), (001) and (200), (002) diffraction X-ray peaks were notably larger than those of the solid phase reaction products obtained at the customary temperature of 1055° C., as shown for example in FIG. 9. From this it follows that the PE phase fine lead titanate crystals are oriented predominantly in the pressuring direction during the charging of the glass sample according to the powder method.

Figure 10:
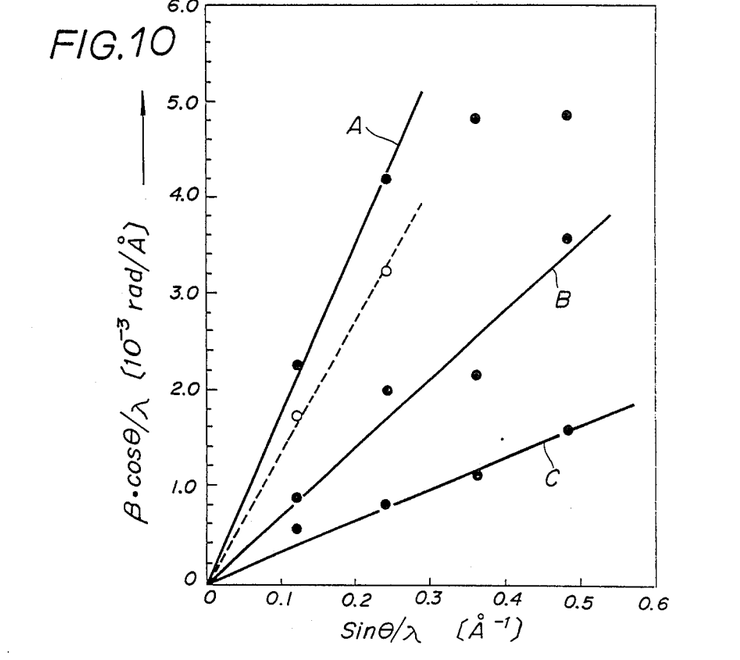
FIG. 10 is a plot of $\beta \cdot \cos \theta / \lambda$ vs. $\sin \theta / \lambda$ phases diagram illustrating the lattice strain of the PE phase fine crystals of lead titanate.

In addition, since the PE phase fine crystals can be easily oriented upon application thereof, (003) and (004) peaks usually not observed as diffraction peaks are apparent in the X-ray diffraction spectrum. Taking advantage of this, and by using the Jones' method, $\beta \cdot \cos \theta/\lambda$-$\sin \theta/\lambda$, where $\beta$ indicates the integration width of the diffraction X-ray peak and $\lambda$ the X-ray wavelength, was plotted in a chart and the crystal lattice strain along the c-axis of the resulting PE phase fine lead titanate crystals was investigated. The results are shown in FIG. 10. In this Figure, the straight lines A, B and C stand for the PE phase lead titanate crystals obtained at a reaction temperature of 2000° C., the same crystals heat-treated at 830° C., and the same crystals heat-treated at 1220° C., respectively. The broken lines indicate the perovskite type lead titanate fine crystals obtained by the solid phase reaction at 1055° C.

In this Figure, the acute gradient of the straight line indicates the larger fluctuations in the lattice constant. It is therefore seen from this Figure that when the PE phase fine lead titanate is heat-treated to a more or less extent, the resulting product shows less acute gradient than that of the conventional solid phase reaction product with less lattice fluctuations with respect to the c-axis.

Figure 11:
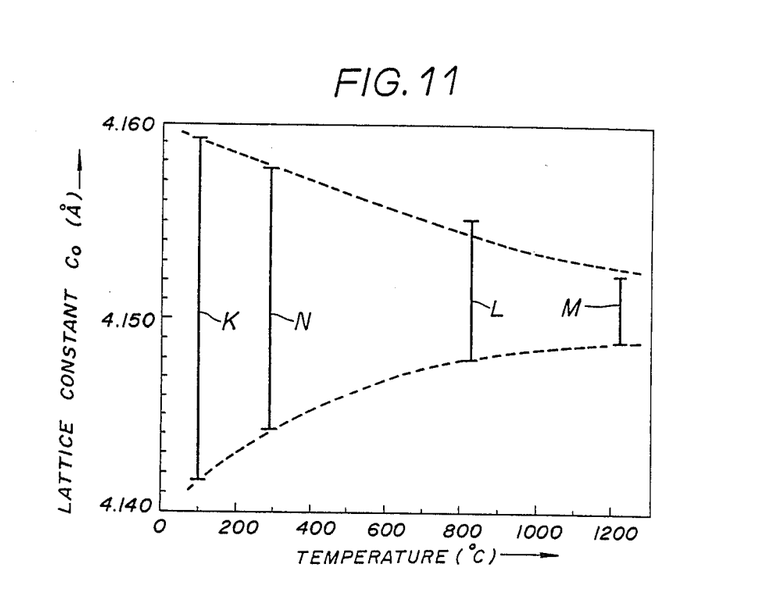
FIG. 11 is a diagram showing the temperature dependency of the c-axis lattice constant fluctuations in the PE phase crystals of lead titanate.

On the basis of FIG. 10, the heat treatment temperature dependency of the lattice constant fluctuations with respect to the c-axis in these PE phase fine lead titanate crystals was investigated. The results are shown in FIG. 11. In this Figure, K represents the range of the lattice constant about the c-axis of the PE phase fine lead titanate crystals obtained at the reaction temperature of 200° C., L stands for the same crystals subsequently heat-treated at 830° C., and M refers to the same crystals subsequently heat-treated at the temperature of the perovskite fine lead titanate crystals prepared by a solid phase reaction at 1055° C.

It will be seen from FIG. 11 that the range of the c-axis lattice constant is lowered with increase in the heat treatment temperature. The comparable solid phase method product heat-treated at 1055° C. is in no way superior to the PE phase fine lead titanate crystals of the present examples subsequently heat-treated at about 300° C. The product of the present example is also improved with respect to lattice fluctuations.

Figure 12:
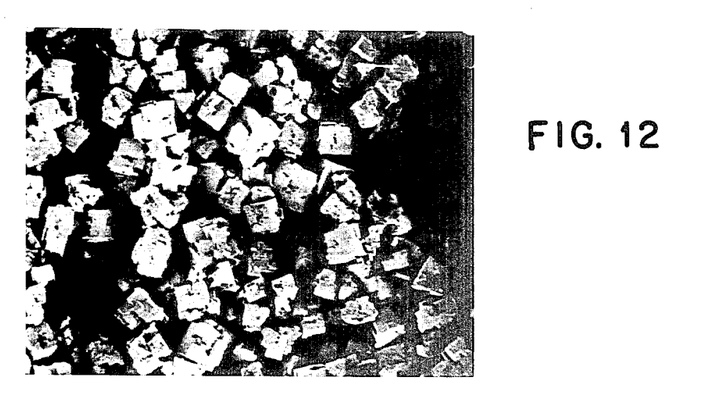
FIG. 12 is an SEM photo of the PE phase fine lead titanate crystals.

Upon composition analysis of the fine PE phase lead titanate crystals of the present example, it was confirmed that the Pb/TI ratio was equal to 1.006±0.005, thus establishing extremely high stoichiometricity. It may be seen from the SEM photo in FIG. 12 that the fine PE phase lead titanate crystals of the present example are in the form of cubes with each side being 7 to 8 microns and having overall square surfaces.

Figure 13:
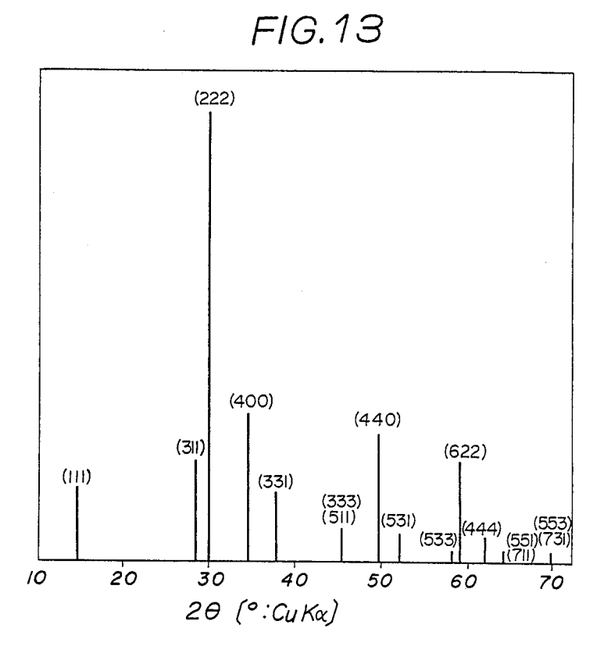
FIG. 13 shows an X-ray diffraction spectrum of the fine lead titanate crystals of the PY phase synthesized at a reaction temperature of 148° C.

On the other hand, fine PY phase lead titanate crystals are produced at the same pH range but at lower temperatures, not higher than 170° C. FIG. 13 shows the X-ray diffraction spectrum (Cu target and Ni filter)

of the PY-phase fine lead titanate crystals produced after a reaction of one hour. The resulting phase was identified as the perovskite phase because of coincidence of the X-ray diffraction spectrum with the JCPDS card (26-142). It was also confirmed that the crystals are cubic with a lattice constant equal to 10.37 Å.

Figure 14:
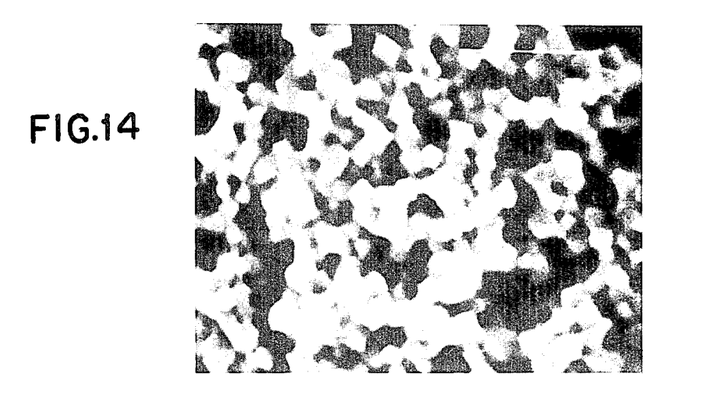
FIG. 14 is an SEM photo showing the PY phase fine lead titanate crystals.

It was also observed from the SEM photo shown in FIG. 14 that PY phase fine lead titanate crystals obtained by the present example were spherical with the particle size at 0.2 microns and above.

Figure 15:
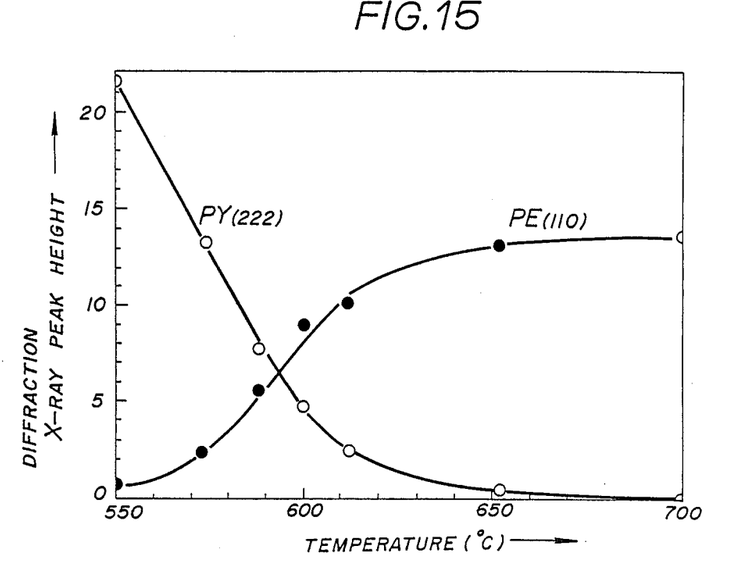
FIG. 15 is a diagram showing the phase transition from the PY to the PE phases.

These PY phase fine crystals of lead titanate when heat-treated undergo phase transition into the PE phase. The resulting PY phase fine lead titanate crystals were heat-treated for investigatingthe state of phase transition. It was seen, as shown in FIG. 15, that the phase transition into the PE phase was initiated at or near 550° C. and was nearly completed at more than 650° C. The PY to PE ratio was determined from the (222) diffraction X-ray peak of the PY phase and from the (110) diffraction X-ray peak of the PE phase.

It will be noted that a heat treatment temperature higher than 520° C. and preferably higher than 550° C. is used, provided that the retention time at the heat treatment temperature is 10 hours or longer. In the absence of this retention time at the ultimate temperature, phase transition to the PE phase is started with a heat treatment temperature higher than 580° C. When completely using the ferroelectric PE phase, it is preferred that the heat treatment be effected at higher than 650° C. When a higher activity is desired, a lower heat treatment temperature is preferred. Heat treatment at, for example, 570° to 610° C. results in fine lead titanate crystals that are highly promising as a high density material, while the particle activity is maintained to a significant extent.

While there is no limitation placed on the rate of temperature elevation during heat treatment, the rate may be lower for the heat treatment at lower temperatures and higher for that of higher temperatures. The rate selection depends on productivity and other factors.

The heat-treated product can be molded simultaneously without provisional calcination, that is, it can be molded in one step.

EXAMPLE 4

By using methods similar to those of the preceding examples, the PE, PX and PY phase crystals were prepared and separately subjected to thermal analysis. The conditions of the preparation of the respective phases were: a pH of 14.0, a reaction temperature of 210° C., and a reaction time of one hour for PE; a pH of 13.0, a reaction temperature of 206° C. and a reaction time of one hour for PX; and a pH of 14.0, a reaction temperature of 118° C., and a reaction time of one hour for PY.

For thermal analysis, the rate of temperature elevation was set at 20° C./minute and the compound $Pb_{1/2}LA_{1/3}TiO_3$ having a thermal capacity close to that of $PbTiO_3$ was used as the standard or reference sample. This reference material was obtained by mixing commercial PbO, $La_2O_3$ and $TiO_2$ at a predetermined molar ratio and subjecting the resulting mixture to a solid-phase reaction. This product is convenient since its Curie temperature is lower than ambient temperature.

Figure 16:
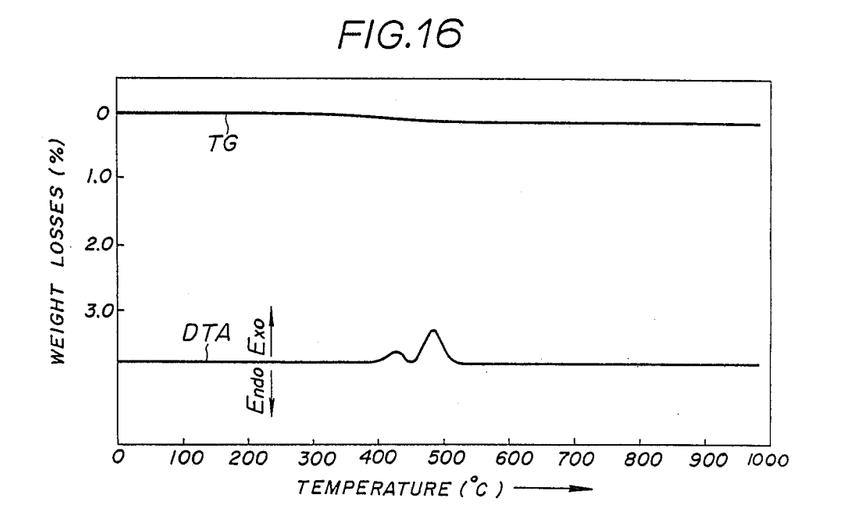
FIG. 16 is a diagram showing the results of thermal analysis of the PE phase fine crystals of lead titanate.
Figure 17:
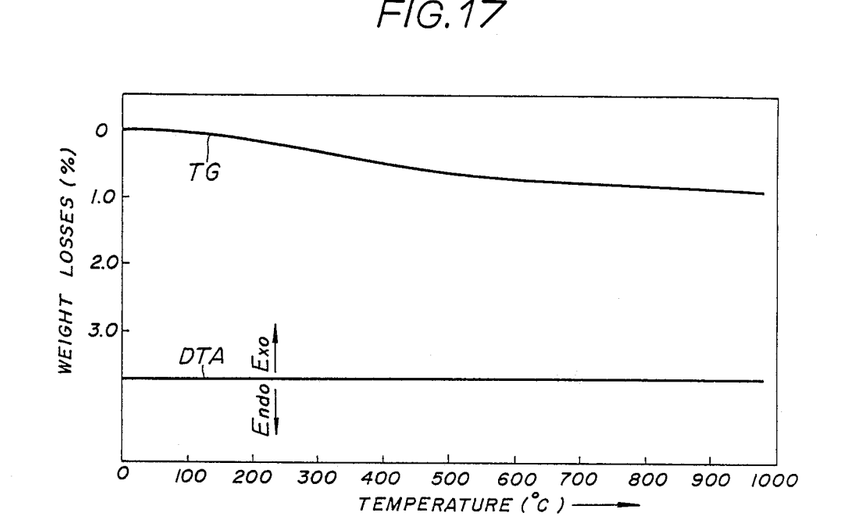
FIG. 17 is a diagram showing the results of thermal analysis of the PX phase fine crystals of lead titanate.
Figure 18:
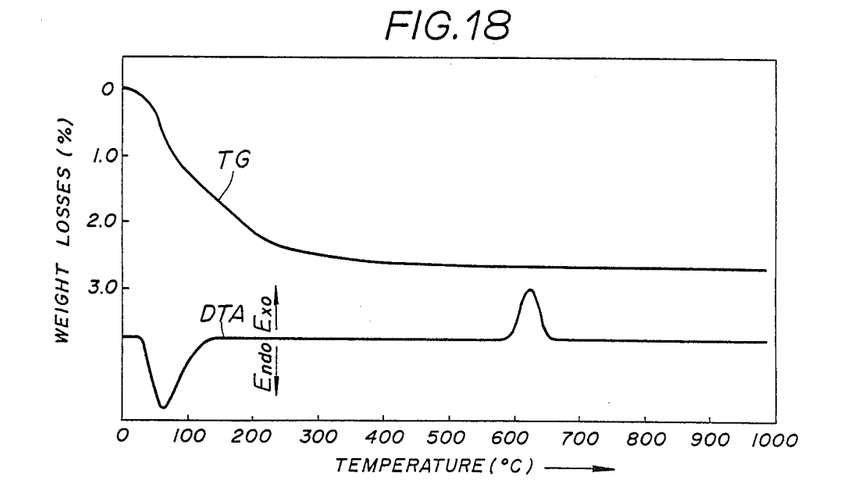
FIG. 18 is a diagram showing the results of thermal analysis of the PY phase fine crystals of lead titanate.

The results of thermal analysis of these PE, PX and PY phases are shown in FIGS. 16, 17 and 18. In these Figures, the straight lines TG and DTA stand for the results of the thermogravimetric analysis and the differential thermal analysis, respectively. In the differential thermal analysis, Exo and End stand for exothermal and endothermal states, respectively.

It will be seen from FIG. 16 that the fine PE phase lead titanate crystals do not suffer from weight losses and the exothermal reaction is observed twice in the 400° to 500° C. range. The exothermal reaction at the high temperature is considered to be heat emission at the Curie temperature accompanying the transition from the tetragonal to the cubic crystals. It is also seen from FIG. 17 that with the PX phase fine lead titanate crystals, weight reduction is substantially not observed while neither the exothermal nor the endothermal reaction is observed, as evidenced by the differential thermal analysis. It will also be seen from FIG. 18 that with the PY phase fine crystals of lead titanate, adsorbed water is initially desorbed, while the heat evolution due to phase transformation from the pyrochlore to perovskite phase is observed in the vicinity of 625° C.

From the foregoing, it will be understood that the present invention provides needle-like fine crystals of lead titanate having a completely novel crystal phase. The length to diameter ratio of these crystals approaches 100. The needle configuration is maintained even after phase transition into perovskite structure by means of heat treatment. The novel crystals are believed to be highly meritorious for use as composite materials.

In addition, these crystals are excellent in stoichiometricity and purity at the time of synthesis. When using these crystals as piezoelectric elements, it would be possible to reduce the contents of impurities in the elements and improve their properties.

By selecting the pH value and the reaction temperature in the wet synthesis in the alkaline aqueous solution, needle-like products with a novel crystal phase, perovskite products, and pyrochlore phase products can be selectively produced. Above all, the products with the novel crystal phase (PX phase) can be selectively produced by setting the pH value in the range of 11.2 to 13.0 and the reaction temperature to more than 145° C.

It will be evident that various modifications can be made to the described embodiments without departing from the scope of the present invention.

We claim as our invention:

1. A method for manufacturing fine powder of lead titanate ($PbTiO_3$) which comprises:
   reacting a water soluble titanium compound or hydrolysis product of a hydrolyzable titanium compound with a lead compound and an anqueous alkaline solution at a pH between 11.2 and 13.0 at a temperature not less than 145° C. to obtain a precipitate of lead titanate fine powder,
   filtering said lead titanate fine powder from the remaining solution, and
   heating the filtered fine powder to a temperature not lower than 520° C. to obtain acicular-shaped lead titanate powder having a perovskite structure.

2. A method according to claim 1 wherein said heating temperature is not less than 650° C.

3. A method for manufacturing fine powder of lead titanate ($PbTiO_3$) which comprises:
   reacting a water soluble titanium compound or hydrolysis product of a hydrolyzable titanium compound with a lead compound in an anqueous alkaline solution at a pH value not less than 13, maintaining the temperature in the range of 110° to 175° C. to obtain a precipitate of lead titanate fine powder, filtering said lead titanate fine powder from the remaining solution, and heating the filtered fine powder at a temperature of at least 520° C. to obtain lead titanate fine powder having a perovskite structure.

4. A method according to claim 3 wherein said heating temperature is not less than 650° C.

* * * * *